US008579697B2

(12) United States Patent
Mishra

(10) Patent No.: US 8,579,697 B2
(45) **Date of Patent: *Nov. 12, 2013**

(54) GAMING SYSTEM INCLUDING MULTIPLE DISPLAYS HAVING GAME SYMBOLS WITH COMMON CHARACTERISTICS

(75) Inventor: Kunal Mishra, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1197 days.

This patent is subject to a terminal disclaimer.

(21) Appl. No.: 12/108,891

(22) Filed: Apr. 24, 2008

(65) Prior Publication Data

US 2008/0200238 A1 Aug. 21, 2008

Related U.S. Application Data

(63) Continuation of application No. 10/243,070, filed on Sep. 12, 2002, now Pat. No. 7,399,226.

(51) Int. Cl.
*A63F 13/00* (2006.01)

(52) U.S. Cl.
USPC ............. 463/20; 463/18; 273/138.1; 273/139

(58) Field of Classification Search
USPC ............................ 463/16–22; 273/138.1, 138
See application file for complete search history.

(56) References Cited

U.S. PATENT DOCUMENTS 1,527,929 A 2/1925 Simons
4,448,419 A 5/1984 Telnaes
4,508,353 A 4/1985 Meyer et al.
4,624,459 A 11/1986 Kaufman
4,695,053 A * 9/1987 Vazquez et al. ................ 463/18
4,732,386 A 3/1988 Rayfiel
4,775,155 A 10/1988 Lees
5,072,946 A 12/1991 Miller
5,205,555 A 4/1993 Hamano
5,324,041 A 6/1994 Boylan et al.
5,423,539 A 6/1995 Nagao
5,449,173 A 9/1995 Thomas et al.
5,511,781 A 4/1996 Wood et al.
5,531,441 A 7/1996 Dabrowski et al.
5,536,016 A 7/1996 Thompson (Continued)

FOREIGN PATENT DOCUMENTS

DE 3700861 7/1988
DE 4014477 7/1991

(Continued)

OTHER PUBLICATIONS

Addams Family Article written by Strictly Slots, published Jul. 2000.

(Continued)

*Primary Examiner* — Dmitry Suhol
*Assistant Examiner* — Alex F. R. P. Rada, II
(74) *Attorney, Agent, or Firm* — Neal, Gerber & Eisenberg LLP

(57) ABSTRACT

A gaming system and method involving a game having a plurality of symbols. The gaming system displays a play of the game on a first display while displaying a sequence of the symbols on a second display. The gaming system includes one award associated with the play and another award associated with a characteristic in common between a symbol displayed on the first display and a symbol indicated on the second display.

25 Claims, 2 Drawing Sheets

(56) References Cited

U.S. PATENT DOCUMENTS

| | | | |
|---|---|---|---|
| 5,542,669 A | 8/1996 | Charron et al. | |
| 5,560,603 A | 10/1996 | Seelig et al. | |
| 5,607,162 A | 3/1997 | Boylan et al. | |
| 5,611,535 A | 3/1997 | Tiberio | |
| 5,707,285 A | 1/1998 | Place et al. | |
| 5,722,891 A | 3/1998 | Inoue | |
| 5,743,798 A | 4/1998 | Adams et al. | |
| 5,769,716 A | 6/1998 | Saffari et al. | |
| 5,772,509 A | 6/1998 | Weiss | |
| 5,788,573 A | 8/1998 | Baerlocher et al. | |
| 5,823,874 A | 10/1998 | Adams | |
| 5,848,932 A | 12/1998 | Adams | |
| 5,851,148 A | 12/1998 | Brune et al. | |
| 5,863,041 A | 1/1999 | Boylan et al. | |
| 5,882,261 A | 3/1999 | Adams | |
| 5,902,184 A | 5/1999 | Bennett | |
| 5,911,418 A | 6/1999 | Adams | |
| 5,919,091 A | 7/1999 | Bell et al. | |
| 5,935,002 A | 8/1999 | Falciglia | |
| 5,944,314 A | 8/1999 | Stavinsky | |
| 5,947,820 A | 9/1999 | Morro et al. | |
| 5,951,397 A | 9/1999 | Dickinson | |
| 5,988,643 A | 11/1999 | Awada | |
| 5,989,121 A | 11/1999 | Sakamoto | |
| 5,996,997 A | 12/1999 | Kamille | |
| 6,004,205 A | 12/1999 | Lauretta et al. | |
| 6,004,207 A | 12/1999 | Wilson, Jr. et al. | |
| 6,015,346 A | 1/2000 | Bennett | |
| 6,033,306 A | 3/2000 | De Souza | |
| 6,033,307 A | 3/2000 | Vancura | |
| 6,056,642 A | 5/2000 | Bennett | |
| 6,059,289 A | 5/2000 | Vancura | |
| 6,059,658 A | 5/2000 | Mangano et al. | |
| 6,089,976 A | 7/2000 | Schneider et al. | |
| 6,089,977 A | 7/2000 | Bennett | |
| 6,089,978 A | 7/2000 | Adams | |
| 6,102,798 A | 8/2000 | Bennett | |
| 6,105,962 A | 8/2000 | Malavazos et al. | |
| 6,117,009 A | 9/2000 | Yoseloff | |
| 6,126,542 A | 10/2000 | Fier | |
| 6,129,355 A | 10/2000 | Hahn et al. | |
| 6,142,873 A | 11/2000 | Weiss et al. | |
| 6,149,521 A | 11/2000 | Sanduski | |
| 6,159,096 A | 12/2000 | Yoseloff | |
| 6,159,098 A | 12/2000 | Slomiany et al. | |
| 6,164,652 A | 12/2000 | Lauretta et al. | |
| 6,173,955 B1 | 1/2001 | Perrie et al. | |
| 6,174,234 B1 | 1/2001 | Seibert, Jr. et al. | |
| 6,174,235 B1 | 1/2001 | Walker et al. | |
| 6,190,254 B1 | 2/2001 | Bennett | |
| 6,203,429 B1 | 3/2001 | Demar et al. | |
| 6,224,483 B1 | 5/2001 | Mayeroff | |
| 6,227,969 B1 | 5/2001 | Yoseloff | |
| 6,227,971 B1 | 5/2001 | Weiss | |
| 6,231,442 B1 | 5/2001 | Mayeroff | |
| 6,234,897 B1 | 5/2001 | Frohm et al. | |
| 6,261,177 B1 | 7/2001 | Bennett | |
| 6,270,412 B1 | 8/2001 | Crawford et al. | |
| 6,287,197 B1 | 9/2001 | Dickinson et al. | |
| 6,299,165 B1 | 10/2001 | Nagano | |
| 6,305,686 B1 | 10/2001 | Perrie et al. | |
| 6,309,300 B1 | 10/2001 | Glavich | |
| 6,312,334 B1 | 11/2001 | Yoseloff | |
| 6,315,663 B1 | 11/2001 | Sakamoto | |
| 6,315,666 B1 | 11/2001 | Mastera et al. | |
| 6,322,309 B1 | 11/2001 | Thomas et al. | |
| 6,331,143 B1 | 12/2001 | Yoseloff | |
| 6,334,814 B1 | 1/2002 | Adams | |
| 6,336,860 B1 | 1/2002 | Webb | |
| 6,336,863 B1 * | 1/2002 | Baerlocher et al. | 463/27 |
| 6,346,043 B1 | 2/2002 | Colin et al. | |
| 6,347,996 B1 | 2/2002 | Gilmore et al. | |
| 6,354,593 B1 | 3/2002 | Frommer et al. | |
| 6,358,146 B1 | 3/2002 | Adams | |
| 6,358,147 B1 | 3/2002 | Jaffe et al. | |
| 6,368,216 B1 | 4/2002 | Hedrick et al. | |
| 6,375,567 B1 | 4/2002 | Acres | |
| 6,386,973 B1 | 5/2002 | Yoseloff | |
| 6,394,902 B1 * | 5/2002 | Glavich et al. | 463/20 |
| 6,398,218 B1 | 6/2002 | Vancura | |
| 6,398,644 B1 | 6/2002 | Perrie et al. | |
| 6,533,273 B2 | 3/2003 | Cole et al. | |
| 6,561,902 B1 | 5/2003 | Walker et al. | |
| 6,572,471 B1 | 6/2003 | Bennett | |
| 6,592,457 B1 | 7/2003 | Frohm et al. | |
| 6,612,574 B1 | 9/2003 | Cole et al. | |
| 6,669,559 B1 | 12/2003 | Baerlocher et al. | |
| 6,749,502 B2 | 6/2004 | Baerlocher | |
| 7,614,949 B2 * | 11/2009 | Anderson et al. | 463/20 |
| 2002/0022514 A1 | 2/2002 | Randall et al. | |
| 2002/0025847 A1 | 2/2002 | Thomas et al. | |
| 2002/0034974 A1 | 3/2002 | Wood et al. | |
| 2002/0077167 A1 | 6/2002 | Merari | |
| 2002/0137559 A1 | 9/2002 | Baerlocher | |
| 2004/0097282 A1 | 5/2004 | Baerlocher et al. | |

FOREIGN PATENT DOCUMENTS

| | | |
|---|---|---|
| EP | 0945837 A2 | 9/1999 |
| EP | 0984408 A2 | 3/2000 |
| GB | 2072395 | 9/1981 |
| GB | 2 117 155 | 10/1983 |
| GB | 2201821 | 9/1988 |
| GB | 2202984 | 10/1988 |
| GB | 2 262 642 | 6/1993 |
| GB | 2 335 524 | 9/1999 |
| GB | 2 393 021 | 3/2004 |
| GB | 2 396 566 | 6/2004 |
| JP | 06007498 | 1/1994 |
| WO | WO 9732285 | 9/1997 |
| WO | WO 00/12186 | 3/2000 |
| WO | WO 01/34261 A1 | 5/2001 |
| WO | WO 2005/028045 A2 | 3/2005 |

OTHER PUBLICATIONS

All Grown Up written by Sodak Gaming, Inc., published in 2003, on or before December thereof.

Austin Powers written by IGT, published in 2001, on or before December thereof.

Catch a Wave Article written by IGT, published in 2001, on or before December thereof.

Clue—Most Wanted Advertisement published by Mikohn in 2003, on or before December thereof.

Clue Advertisement published by Mikohn in 2002, on or before December thererof.

Jackpot Party Brochures and Articles, WMS Gaming Inc., 1998.

On the Money Article written by Casino Data System, published Dec. 2000.

Price is Right Showcase Showdown, written by IGT, published in 2001, on or before December thereof.

Red, White and Blue Advertisement written by IGT, published in 2000, on or before December thereof.

Rules of Card Games: One Minute Solitaire, published at www.pagat.com (website last updated Jan. 12, 2002), dated 1989 on or before December thereof.

Slot Machines Article by Marshall Fey, published 1983, 1989, 1991, 1994 and 1997 in or before December therof.

Slots 2003, part one, written by Melissa Raimondi, published Jan. 2003.

South Park written by IGT, published in 2000, on or before December thereof.

Trivial Pursuit Advertisement published by Mikohn in 2003, on or before December thereof.

(56) References Cited

OTHER PUBLICATIONS

Uno and Magic 8 Ball Slots Offer a One-Two Punch of Fun!, Slotline 2003, summer edition, 2003, on or before December thereof.
Uno Game Description by C.R. Light & Co., published in 1900, on or before December thereof.
Uno Game Illustration, written by Marshall Fey, published in 1983, 1989, 1991, 1994 and 1997, in or before December thereof.
Uno Original Instructions, Mattel, Inc., 1998, in or before December thereof.
Unusual Suspects—Clue Advertisement published by Mikohn in 2003, on or before December thereof.

* cited by examiner

GAMING SYSTEM INCLUDING MULTIPLE DISPLAYS HAVING GAME SYMBOLS WITH COMMON CHARACTERISTICS

PRIORITY CLAIM

This application is a continuation of, and claims the benefit of and priority to, U.S. patent application Ser. No. 10/243,070, filed on Sep. 12, 2002 the entire contents of which are incorporated herein.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

1. Field of the Invention

The present invention relates to wagering games, particularly apparatus-based wagering games generally referred to under the term of slot machines, and computer-based wagering games running on these slot machines, and methods of playing games on these machines.

2. Background of the Art

Games of chance have been enjoyed by people for thousands of years and have enjoyed increased and widespread popularity in recent times. As with most forms of entertainment, players enjoy playing a wide variety of games and playing new games. Playing new games adds to the excitement of "gaming." As is well known in the art and as used herein, the term "gaming" and "gaming devices" are used to indicate that some form of wagering is involved, and that players must make wagers of value, whether actual currency or some equivalent of value, e.g., token or credit. This is an accepted distinction in the art from the playing of games, which implies the absence of a wager of value, capable of returning a payout and in which skill is ordinarily an essential part of the game. On the contrary, within the gaming industry, particularly in computer based gaming systems, the absence of skill is a jurisdictional requirement in the performance of gaming play.

One popular gaming system of chance is the slot machine. Conventionally, a slot machine is configured for a player to wager something of value, e.g., currency, house token, established credit or other representation of currency or credit. After the wager has been made, the player activates the slot machine to cause a random event to occur. The player wagers that particular random events will occur that will return value to the player. A standard device causes a plurality of reels to spin and ultimately stop, displaying a random combination of some form of indicia, for example, numbers or symbols. If this display contains one of a pre-selected number of winning combinations, the machine releases money into a payout chute or increments a credit meter by the amount won by the player. For example, if a player initially wagered two coins of a specific denomination and that player achieved a payout, that player may receive the same number as or multiples of the wager amount in coins of the same denomination as wagered.

There are many different formats for generating the random display of events that can occur to determine payouts in wagering devices. The standard or original format for slot machines was the use of three mechanical or electromechanical reels with symbols distributed over the face of the wheel. When the three reels were spun, they would eventually each stop in turn, displaying a combination of three symbols (e.g., with three reels and the use of a single payout line as a row in the middle of the area where the symbols are displayed). By appropriately distributing and varying the symbols on each of the reels, the random occurrence of predetermined winning combinations can be provided in mathematically predetermined probabilities. By clearly providing specific probabilities for each of the pre-selected winning outcomes, precise odds that control the amount of the payout for any particular combination and the percentage return on wagers for the house were reasonably controlled.

Other formats of gaming apparatus that have developed in a progression from the standard slot machine with three reels have dramatically increased with the development of video gaming apparatus. Rather than have only mechanical elements such as wheels or reels that turn and stop to randomly display symbols, video gaming apparatus and the rapidly increasing sophistication in hardware and software have enabled an explosion of new and exciting gaming apparatus. The earlier video apparatus merely imitated or simulated the mechanical slot games in the belief that players would want to play only the same games. Early video gaming systems therefore were simulated slot machines. The use of video gaming apparatus to play new gaming applications such as draw poker and Keno broke the ground for the realization that there were many untapped formats for gaming apparatus. Now casinos may have hundreds of different types of gaming apparatus with an equal number of significant differences in play. The apparatus may vary from traditional three reel slot machines with a single payout line, video simulations of three reel video slot machines, to five reel, five column simulated slot machines with a choice of twenty or more distinct pay lines, including randomly placed lines, scatter pays, or single image payouts. In addition to the variation in formats for the play of gaming applications, bonus plays, bonus awards, and progressive jackpots have been introduced with great success. The bonuses may be associated with the play of gaming applications that are quite distinct from the play of the original gaming format, such as the video display of a horse race with "bets" on the individual horses randomly assigned to players that qualify for a bonus, the spinning of a random wheel with fixed amounts of a bonus payout on the wheel (or simulation thereof), or attempting to select a random card that is of higher value than a card exposed on behalf of a virtual "dealer."

Examples of such gaming apparatus with a distinct bonus feature includes U.S. Pat. Nos. 5,823,874; 5,848,932; 5,836,041; U.K. Patent Nos. 2 201 821 A; 2 202 984 A; and 2 072 395A; and German Patent DE 40 14 477 A1. Each of these patents differs in fairly subtle ways as to the manner in which the bonus round is played. British Patent 2 201 821 A and DE 37 00 861 A1 describe a gaming apparatus in which after a winning outcome is first achieved in a reel-type gaming segment, a second segment is engaged to determine the amount of money or extra games awarded. The second segment gaming play involves a spinning wheel with awards listed thereon (e.g., the number of coins or number of extra plays) and a spinning arrow that will point to segments of the wheel with the values of the awards thereon. A player will press a stop button and the arrow will point to one of the values. The specification indicates both that there is a level of skill possibly involved in the stopping of the wheel and the arrow(s), and also that an associated computer operates the random selection of the rotatable numbers and determines the results in the additional winning game, which indicates some level of random selection in the second gaming segment.

U.S. Pat. Nos. 5,823,874 and 5,848,932 (describing IGT and Anchor Gaming's "Wheel of Fortune" game) describe a gaming device comprising: a first, standard gaming unit for displaying a randomly selected combination of indicia, said displayed indicia selected from the group consisting of reels, indicia of reels, indicia of playing cards, and combinations thereof; means for generating at least one signal corresponding to at least one select display of indicia by said first, standard gaming unit; means for providing at least one discernible indicia of a mechanical bonus indicator, said discernible indicia indicating at least one of a plurality of possible bonuses, wherein said providing means is operatively connected to said first, standard gaming unit and becomes actuatable in response to said signal. In effect, the second gaming event simulates a mechanical bonus indicator such as a roulette wheel or wheel with a pointing element.

Various other games played on gaming equipment include bonus features and matching game features. Some of these games include, but are not limited to U.S. Pat. No. 6,059,658 (Mangano et al.) Spinning Wheel Game and Device Therefor; U.S. Pat. No. 6,398,218 (Vancura) Game Machine With Bonusing; U.S. Pat. No. 6,375,567 (Acres) Method and Apparatus for Implementing in Video a Secondary Game Responsive to Player Interaction with a Primary Game; U.S. Pat. No. 6,368,216 (Hedrick et al.) Gaming Machine Having Secondary Display for Providing Video Content; U.S. Pat. No. 6,358,147 (Jaffe et al.), Gaming Machine with Multiple Payoff Modes and Award Presentation Schemes; U.S. Pat. No. 6,336,863 (Baerlocher et al.) Gaming device with Bonus Mechanism; U.S. Pat. No. 6,315,666 (Mastera et al.) Gaming Machines Having Secondary Display for Providing Video Content; U.S. Pat. No. 6,142,873 (Weiss et al.) Gaming Device; U.S. Pat. No. 6,033,307 (Vancura) Gaming Machine with Bonusing; U.S. Pat. No. 6,059,289 (Vancura) Gaming Machines with Bonusing; U.S. Pat. No. 6,394,902 (Glavich et al.) Gaming device having different sets of primary and secondary reel symbols; U.S. Pat. No. 6,270,412 (Crawford et al.) Gaming Device with Symbol Save Feature; Frommer et al. U.S. Pat. Nos. 6,354,593; 6,331,143 (Yoseloff) Video Numbers Game; U.S. Pat. No. 6,312,334 (Yoseloff) Method of Playing a Multi-Stage Video Wagering Game; U.S. Pat. No. 6,227,969 (Yoseloff) Match Symbol Side Bet Game; Lauretta et al. U.S. Pat. No. 6,165,652, Match the Dealer; and Lauretta et al. U.S. Pat. No. 6,004,205, Match the Dealer.

U.S. Pat. No. 6,394,902 (Glavich et al.) discloses a gaming device comprising: a display device; a primary game displayed by the display device; at least one set of reels in the primary game including a plurality of primary symbols; a secondary game displayed by said display device; at least one set of reels in the secondary game including a plurality of secondary symbols, wherein the secondary symbols are different than the primary symbols and the number of secondary symbols is less than the number of primary symbols; a plurality of awards associated with the primary and secondary symbols, wherein at least one of the awards associated with the secondary symbols is greater than a plurality of the awards associated with the primary symbols; at least one primary probability of winning associated with said primary symbols and at least one secondary probability of winning associated with the secondary symbols, wherein said primary probability of winning is less than said secondary probability of winning; and a processor which randomly determines symbols indicated by the primary reels and the secondary reels based on the probabilities of winning and, which causes the display device to replace the primary reels with the secondary reels when a triggering event occurs on the primary reels.

U.S. Pat. No. 6,270,412 (Crawford et al.), Gaming Device with Symbol Save Feature describes a slot machine comprising: a display portion displaying a plurality of rotatable reels, each reel having a plurality of symbols on its periphery; a controller for rotating said reels and stopping said reels such that at least one symbol on each reel is displayed to a player of the slot machine across at least one pay line; a selector for allowing said player to store at least one displayed symbol per reel as one or more saved symbols in a memory for use in a subsequent game, said selector being available for use by said player to store said at least one displayed symbol after each game, stored symbols being available for use by said player for a plurality of subsequent games; a display area associated with each of said rotatable reels for displaying said one or more saved symbols of said respective reel; and an award table for awarding a payment to said player for winning combinations of symbols using both said one or more saved symbols and currently displayed symbols for determining a winning combination of symbols.

Japanese Patent Application No. 05-071983, having a publication date of Jan. 18, 1994 describes a rotary game machine of the slot machine type with a bonus feature. When a predetermined event (usually a winning event) occurs on the underlying slot machine game, a separate wheel or disk is spun, with the wheel or disk having symbols thereon representing bonus events or non-bonus events. The spinning of the separate wheel or disk is dependent upon the occurrence of the predetermined event.

It is desirable to provide alternative gaming formats and gaming methods, as the preferences of the players changes over time and new games with unique features are desired by the industry.

SUMMARY OF THE INVENTION

A gaming format is provided on a wagering apparatus. The wagering format comprises a first set of symbol displays, usually in the form of reels, either physical reels or simulated video reels, usually at least three reels such as the standard 3, 4 or 5 reels used on wagering devices, and at least one additional symbol display, especially a symbol display such as a reel, disk or wheel, and especially a reel, disk or wheel dedicated to a display that is distinct from play on the underlying wagering format. Virtual displays or any other form of image displays, such as video displays, LED displays, plasma displays, light panel displays, or the like may also be used to provide the symbol displays and the additional symbol displays. A standard reel-type slot-type game is played on the first set of symbol displays, with predetermined combinations, alignments, positions, and/or types of symbols (e.g., scatter pays, where the alignment of the symbols is immaterial to the outcome) providing winning or losing first game events. Coincident with the first game event, the additional symbol display provides an additional symbol that is compared with the symbols generated on the first set of symbol displays. Independent of the result of the first game events, whether that game event is a win, a push or a loss, the comparison of the additional symbol to the symbols generated on the first set of symbol displays provides a basis for awards on a potentially distinct set of play rules, with potentially different pay tables, and with potentially different predetermined events providing awards.

For example, in the play of the first game, the order of symbols appearing on a pay line may be important (except in scatter pay events), and it is usually necessary (except for certain symbols such as cherries, special symbols, wild symbols or bonus symbols) that there be two or three winning combination symbols on a three reel pay line read from left to right or right to left, or both. In the additional play feature of the present invention, a single additional symbol may be selected, and an award may be given for a match of that additional symbol with one, two or more symbols in the first set of symbol displays, wherever the symbols appear in the pay lines or other predefined winning outcome of the first set of symbols. The award may be based on matches where the order of the symbols appearing on the pay line and/or the need for a base game symbol match is unnecessary. This format also offers the appearance and the effect of two distinct games being simultaneously played from a single wager.

DETAILED DESCRIPTION OF THE INVENTION

Figure 1:
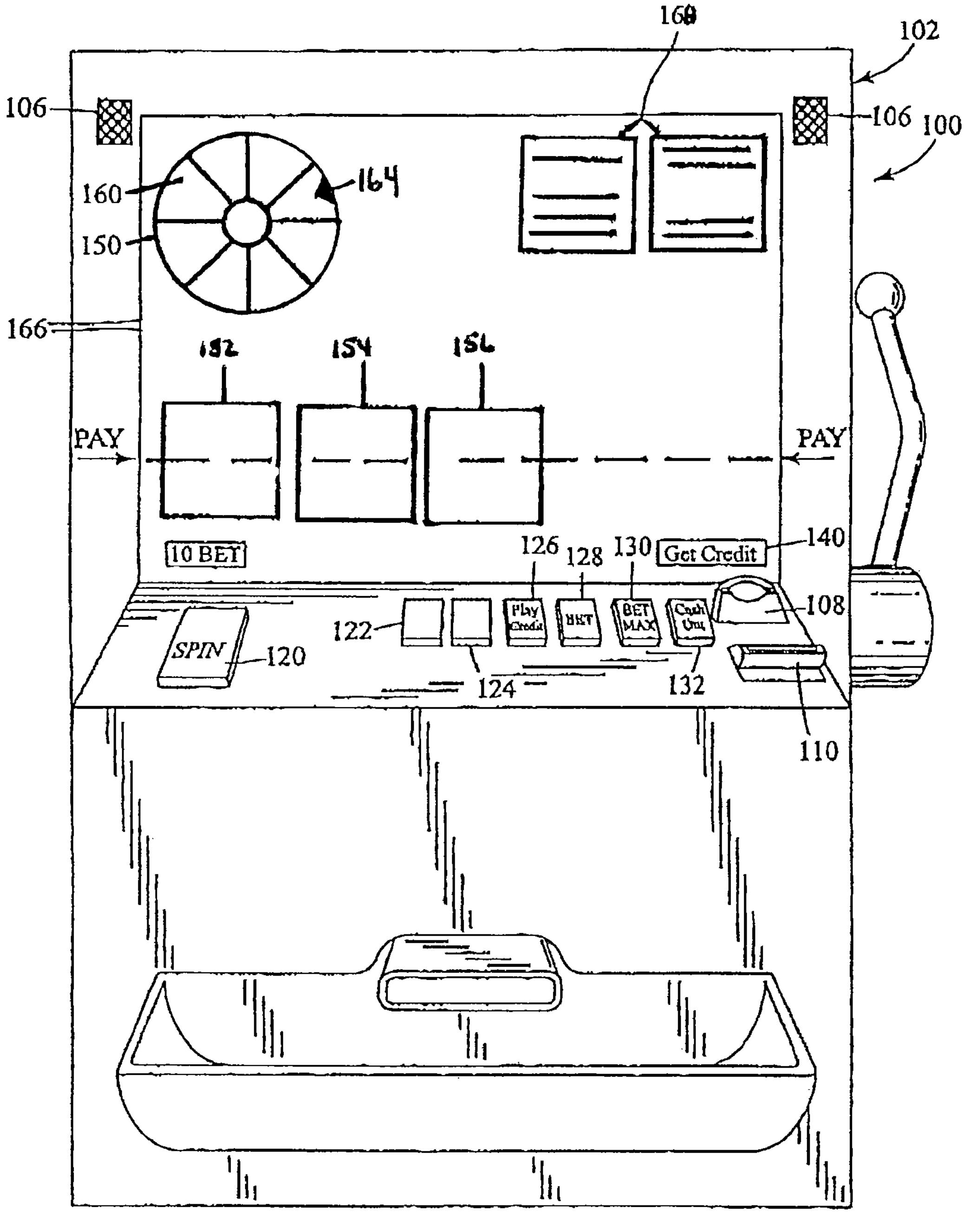
FIG. 1 shows a perspective view of a standard slot-type machine.

A game and gaming format is provided on a wagering apparatus, the gaming apparatus being of the slot-type wagering apparatus. These gaming apparatus are referred to by many names in the art, including one-armed bandits, slot machines, video machines and gaming machines. The specific style of the game, whether in video, mechanical or electromechanical format is not essential to the practice of this invention. The wagering format comprises a first set of symbol displays, usually in the form of reels, usually at least three reels such as the standard 3, 4 or 5 reels used on wagering devices, and at least one additional symbol display, especially a symbol display such as a reel, disk, wheel or video display. However, since the underlying object of games of chance is to obtain predetermined relationships of game symbols such as the occurrence of a single symbol, a match of two or more symbols or a predetermined card combination, for example, as little as one game symbol could be used to participate in the underlying game. For example, the underlying game could be five card poker paying on a queen high or better. In another example, a single "bonus" or special symbol results in a payout. A three-reel display with a single pay line is one preferred format of the invention. As an alternative for the additional symbol display such as a reel, disk or wheel would be an electronic or video display panel with boxes that may be individually highlighted or chosen, a line of symbols, a spiral of symbols, randomly or orderly positioned symbols with lights or other pointing mechanisms, and the like. The symbol displays merely provide a mechanism for providing symbols or images of symbols that are used in wagering games. The typical underlying wagering game, and particularly the reel-type wagering game, requires that at least one specific predetermined symbol, set of symbols, alignment of symbols, or the like be shown on the symbol display. There is usually a pay table or other source of information associated with the game that indicates what symbol(s) or combination(s) or set(s) provide a winning event. The classic standard gaming machine is comprised of a set of reels (e.g., 3, 4 or 5 reels) with indicia displayed at various stop positions on the reels. The reels are spun and then stopped at a stop position, so that each reel displays a symbol (including a blank space as a potential 'symbol'). If the reels display particular symbols, symbols in particular positions, or predetermined combinations of symbols along a pay line, or in another winning combination such as a scatter arrangement, then a winning event occurs. A pay line on the original reel-type gaming equipment constitutes the outermost radial (central) positions on the stopped reels and the line that could be drawn through the outermost position on the stopped reel. A line is usually drawn over a transparent faceplate to indicate the precise position of the pay line. The original slot machines and many current slot machines have only one pay line. The pay lines may be straight or may include bends. Other slot machines have multiple pay lines. Pay lines can also be dynamic, that is—the shape and/or position of the pay line changes from game to game.

The symbols on the reels have varied over the years, but certain symbols are considered 'traditional,' such as cherries, lemons, oranges, bars (single bars, double bars, triple bars), sevens, bells, plums, and the like. Virtual displays or any form of image displays, such as video displays may also be used to provide the symbol displays and the additional symbol display or displays. Other formats for displaying symbols may be used (such as uncovering hidden symbols behind panels by automatic or player induced opening of virtual panels or elimination of graphics on a touch screen display that marks game outcomes), spinning of wheels to collect symbols, rolling of dice, dealing of cards, or any other activity in which a number of symbols are selected in the play of a first wagering game.

In the practice of the invention, a single wager is placed to play a multiple segment game. A standard slot-type game may be used to generate the first set of symbol displays, with predetermined combinations, alignments, positions, and/or types of symbols providing winning or losing first game events. This underlying game format allows for what is known as scatter pay awards also, especially when the visual display shows a grid of game symbols, such as a 3×5 (or 5×5) for example, symbol display, in a 5 reel game. The play of this first underlying game produces a first set of symbols on a pay line, a recognized winning card or card combination (when the underlying game is a card game such as poker), or a scatter arrangement. Coincident with the first game event, and without placing a separate wager, the additional symbol display provides an additional symbol that is compared with the symbols generated on the first set of symbol displays. Independent of the result of the first game events, whether the first game event is a win, a push or a loss, the comparison of the additional symbol to the symbols generated on the first set of symbol displays provides a basis for additional awards on a potentially distinct set of play rules, such as symbol matching regardless of positioning along a pay line, with potentially different pay tables, and with different predetermined events providing awards.

The term "coincident" or "coincidently" has a distinct meaning in the practice of the present invention. The meaning of coincident or coincidently is that is no predetermined event must occur in the play of the first game to enter, cause or initiate play of the distinct and separate match game, other than the mere fact of beginning the first game. The additional symbol display may be in motion before the first game is initiated, may go into motion at the same time that the first game is initiated, may go into motion during the play of the first game (e.g., after at least one reels or symbol display has begun its procedure for symbol determination, but before all final symbols have been displayed), or the additional symbol display may go into motion when all first game symbols have been determined, irrespective of the symbols chosen (that is, whether there is a win, a push or a loss event). Initiation of this last format may be automatic, by player initiation (e.g., pressing a "SPIN" button, or by time delay if a "SPIN" button is not timely activated). There is no predetermined combination of symbols or specific symbol required to initiate activation and/or play of the additional symbol selection procedure. In one preferred form of the game, the additional symbol selection procedure is activated every time the player participates in the first gaming event, preferably with the additional display being activated at the same time or while all of the symbol displays in the underlying game are still active, and without the player placing a separate wager on the occurrence of matches.

The play of a game according to the present invention will be described with reference to the Figures. FIG. 1 shows a gaming apparatus 100 comprising a gaming box 102 and a game display area 166. Typical player controls such as spin button 120, help button 122, change button 124, Play/Credit button 126, Bet button 128, Bet Max button 130, Cash Out button 132, coin insert slot 140, currency insert slot 140, error lights 106, credit total display 140, Pay Line, reel display panels 152, 154 and 156 are shown. Also shown is an additional symbol display, in this case a wheel 150 with eight symbol display areas 160. The additional display system may have fewer, the same or more stop positions or available symbol positions as each of the reels in the underlying game. The number of stop positions in reels is typically between 10 and 30 stop positions (including blanks), more typically between 20 and 25 stop positions. As the determination of probabilities for outcomes can be set by the programmer, correspondence in the number of positions is not critical, but it is convenient to have the same number of stop positions on the reels of the underlying game and the additional display to simplify the math in determining probabilities. Pay tables 168 are also shown on the game display area 166. A game may begin and be played in the following manner. A single or multiple coin, token or credit is used to wager on the play of the game. No additional bets are required to participate in the bonus symbol matching segment. The three reels in the display panels 152, 154 and 156 begin spinning simultaneously or in turn, in a close time sequence. The additional display element, wheel 150 also begins to spin when the reels begin to spin, or immediately before or immediately thereafter. The three reels and the additional symbol display 150 stop at their respective, randomly chosen stop positions, preferably in turn. The three symbols (including a blank space) are read on the Pay Line. If the three symbols (or any combination or single symbol) form a predetermined winning event, the gaming apparatus will provide an award. The pointer 164 points to a single symbol on the additional symbol wheel. The single symbol is compared to the three symbols shown on the Pay Line. If the single symbol matches at least one symbol under the Pay Line and that match combination is identified on the secondary pay table as an award-winning match, then a separate award is provided to the player. This separate award is completely independent of any award that could have been won or was won from the three symbols under the Pay Line. The separate award can be won whether or not the three symbols under the Pay Line were a predetermined winning set of symbols, a specific symbol that would win an award or a symbol combination that does not award a payout.

Figure 2:
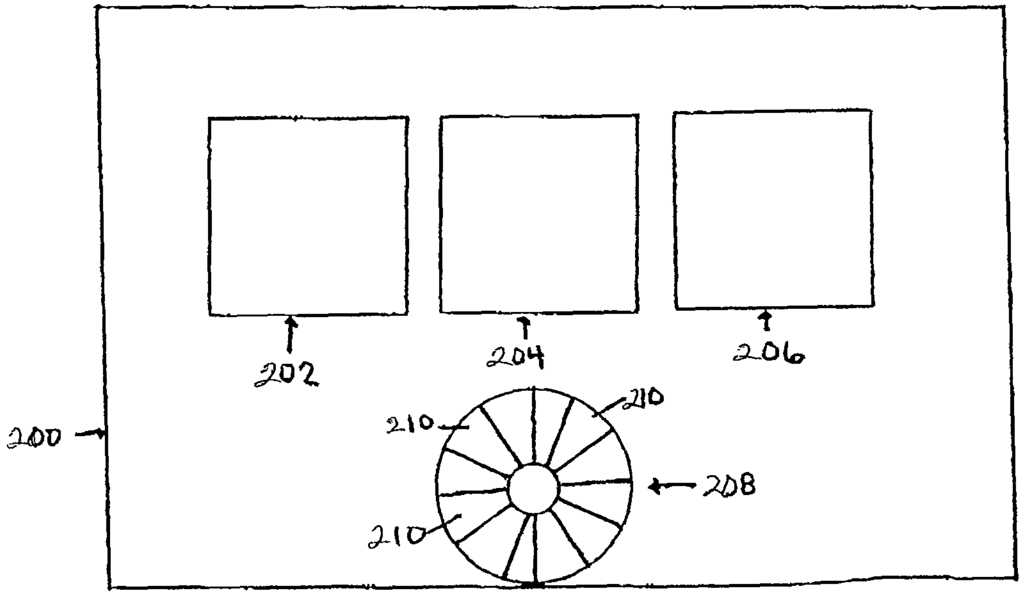
FIG. 2 shows a frontal view of a game panel with three reels and a wheel.

FIG. 2 shows a frontal view of a game panel 200 with three reels 202, 204, 206 and a wheel 208. The three underlying game symbols (not shown) would be displayed on the three reels 202, 204, 206 and the match symbol would be displayed on one of the wedge shaped panels 210 on wheel 208.

Figure 3:
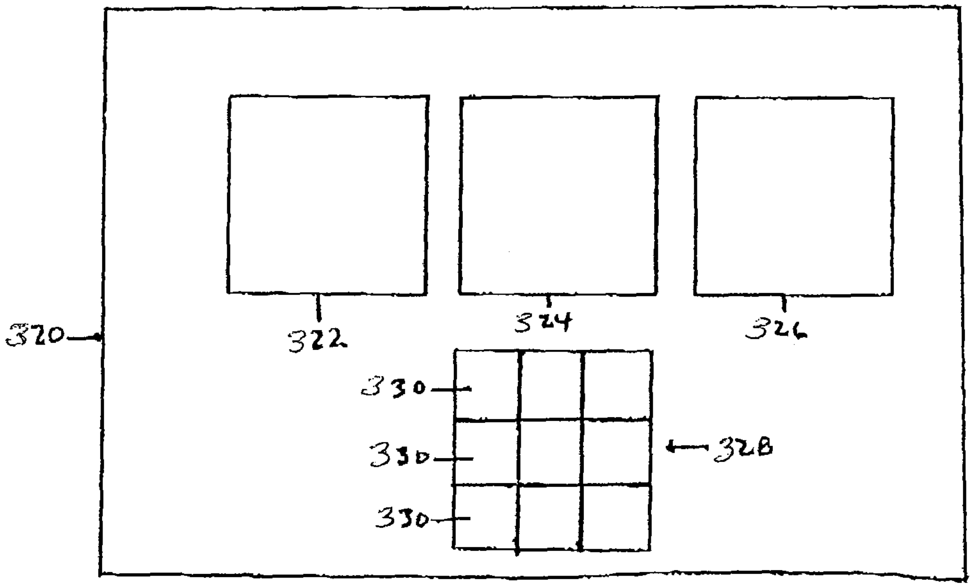
FIG. 3 shows a frontal view of a game panel with three reels and a wheel with specific symbols shown on the first set of displays and the additional display.

FIG. 3 shows a frontal view of a game panel 320 with three reels 322, 324, 326 and a panel with specific symbols (not shown) shown on the first set of displays, three reels 322, 324, 326 and the additional display panel 328. The panel 328 has a number of panels 330 in which the match symbol would be displayed. Examples of pay tables for both the symbol combination (e.g., three reel game) and the additional match game are shown below:

Exemplary Pay Table for Three-Reel Game

| Symbol Combinations | 1st Coin | 2" Coin | 3rd Coin |
|---|---|---|---|
| 7 7 7 | 500 | 1000 | 2500 |
| TB TB TB | 40 | 80 | 120 |
| DB DB DB | 25 | 50 | 75 |
| SB SB SB | 10 | 20 | 30 |
| CH CH CH | 10 | 20 | 30 |
| AB AB AB | 5 | 10 | 15 |
| X X CH | 5 | 10 | 15 |
| X Y CH | 2 | 4 | 6 |

TB = Triple Bar;
DB = Double Bar;
SB = Single Bar;
CH = Cherry;
AB = Any Bar (single, double or triple bar), X = any game symbol (e.g., TB, DB, SB, CH, Blank)
Y = Any game symbol that is not X.

Exemplary Pay Table for Match Wheel Bonus, Irrespective of Three Reel Game Results

| 3-Reel Symbol Combinations | Match Wheel Symbol | 1St Coin | 2nd Coin | 3rd Coin |
|---|---|---|---|---|
| 7 7 7 | 7 | 500 | 1000 | 2500 |
| (2) 7's Anywhere | 7 | 100 | 200 | 300 |
| (1) 7 Anywhere | 7 | 50 | 100 | 150 |
| TB TB TB | TB | 100 | 200 | 300 |
| (2) TB'S Anywhere | TB | 50 | 100 | 150 |
| TB Anywhere | Tb | 25 | 50 | 75 |
| Db DB DB | DB | 50 | 100 | 150 |
| (2) DB's Anywhere | DB | 25 | 50 | 75 |
| (1) DB Anywhere | DB | 10 | 20 | 30 |
| SB SB SB | SB | 20 | 40 | 60 |
| (2) SB's Anywhere | SB | 25 | 50 | 75 |
| (1) SB Anywhere | SB | 5 | 10 | 15 |
| CH CH CH | CH | 10 | 20 | 30 |
| (2) CH's Anywhere | CH | 5 | 10 | 15 |
| (1) CH Anywhere | CH | 2 | 4 | .6 |

The Match Wheel game fourth wheel in this example of the invention is mapped differently from the reels in the underlying three-reel game. There are no blanks on the fourth reel, while the conventional reel on the three reel underlying game has 50% blank spaces as possible stop positions. In other examples of the invention, blanks or other losing symbols are present and may be selected in match play. In the first Example, the symbol mapping on the first three reels is identical. That is, the symbol frequency on the physical reel strip and the order of appearance of each symbol on the reel is identical. There are 22 symbol positions (including in this example 11 blanks) on each reel strip. The wheel has 22 symbol positions, but in this example has no blanks. In another example of the invention as illustrated in FIG. 1, the wheel has only eight positions, and all or fewer symbols appearing on the reel strips are present on the wheel.

The format of the present game offers some significant ability to be varied in both appearance and mathematical effects. Among the many alternatives are at least the following.

a) The symbols on the multiple reel combination game are mapped and/or controlled with a win control algorithm such as the algorithm described in Yoseloff, U.S. Pat. No. 6,159,096 for Method and Apparatus for Configuring a Slot-Type Wagering Game (assigned to Assignee of the present invention), random number generator to provide certain symbols and combinations of symbols at statistical rates, the symbols including blank spaces. The symbols on the additional symbol display device will ordinarily have at least some, if not all of the symbols that are contained on the first multiple reel display game, although blank spaces and/or other game symbols may optionally be excluded from the available symbols on the additional symbol display element. This absence of blank spaces is likely to provide an impression to the player that there will be a high frequency of additional matching awards. The actual rate of award is still statistically determined upon the frequency of the symbol in the additional symbol display matching at least one symbol in the multiple symbol display game. As blank spaces are frequently obtained in reel wagering games (e.g., blank spaces are approximately 50% of all stop positions), all blank spaces are incapable of matching the additional symbol.

b) A special symbol (e.g., a single symbol representing the casino or a special game) may be present on both a) one or more of the reels in the multiple reel game, and b) on the additional reel or wheel. By selecting appropriate frequencies or hit rates for the various symbols, when the match of three symbols on the multiple reels at the same time that the special symbol appears on the additional reel, a special jackpot or progressive jackpot may be provided. By having high frequency rate appearances on three of the four symbols and a low frequency rate on the fourth symbol, an appearance of near misses on the jackpot can also be provided.

c) In the play of b) above, it is possible for a jackpot contribution to be identified from the machine when a certain combination of the special symbols occurs. Rather than taking a percentage of all wagers made and applying it to a jackpot, in one example of the invention, only wager amounts made when there are predetermined combinations of special symbols will be contributed. This methodology avoids duplicating the many jackpot games using a constant percentage contribution. Players may feel more inclined to contribute towards a jackpot when there appears to be a high frequency of near misses to the jackpot.

For example, in the play of the first game, the order of appearance of symbols on a pay line may be important, and it is usually necessary (except for certain symbols such as cherries, special symbols or bonus symbols) that there be two or three winning combination symbols on a three reel pay line, appearing from left to right. Other games permit payouts on combinations appearing from right to left or from both left to right and right to left. In the additional play feature, a single additional symbol is selected, and an award may be given for a match of that additional symbol with one, two or three symbols (that is, between one and the maximum number of symbols on a pay line) in the first set of symbol displays. The award may be based on matches where the order of the symbols and/or the need for a three-symbol match is unnecessary. It would be less preferable to have the order of the symbols contribute to the determination of the amount of the award, but that option is available to the designer of the game. This format also offers the appearance of two distinct games being simultaneously played for a single wager. In another example of the invention, the extra feature is an extra reel on the same pay line (e.g., the three reels and the fourth additional reel are on a common axis of rotation, again this being only a non-limiting example) and an additional bonus payout is determined either by matches or with consecutively positioned combinations of symbols (right to left or left to right or both). The last option means that with the four reel positions (Positions 1, 2, 3 and 4) on the pay line, winning symbol combinations may be found in symbol sets 3 2 1 and symbol set 1 2 3. The fourth reel outcome is not used to score the underlying game. The symbol appearing on the pay line of the fourth reel is compared to the symbols on the pay line on reels 1, 2 and 3 to determine if there is a match. The player is awarded a payout for either a predetermined winning outcome in the underlying game, for a match between the fourth reel symbol and at least one other symbol, or both. In any event, the player may or may not win on either form of action.

It is important to understand that the bonus wheel, reel or other symbol selection device is played in each round of play, and that no separate bet is required to play the matching game. The matching game according to the invention is an integral part of the underlying game and is not a separate bonus event that is played at the player's option.

The gaming apparatus or device of the invention may be generally described as a gaming apparatus having the ability to provide multiple winning events in a single play of a multiple symbol display event. The apparatus may, for example, comprise a housing or cabinet with a microprocessor; a first gaming display that displays at least two symbols from a first set of symbols, wherein predetermined symbols or symbol combinations provide a first award; a second gaming display that coincidently displays at least one separate symbol selected from at least some of the symbols within the first set of symbols; and the gaming apparatus awarding a second prize when the at least one separate symbol matches at least one symbol from among the at least two symbols displayed in the first gaming display. The underlying at least two symbol display is capable of showing at least one symbol that cannot be matched by any symbols available from the second (additional) symbol display, or the second symbol display can provide symbols that, when matching symbols on the first symbol display would not provide a match award. For example, the first symbol display can show blank spaces that are not available on the second display. Additionally, the second symbol display can show blank spaces, and if the second display shows a blank and the blank matches blanks displayed on the first symbol display, there would be no award for a match of blank spaces. In other forms of the invention, matching losing symbols, such as blanks, result in a payout. The gaming apparatus may have blank spaces shown as a symbol within the first set of symbols, and there may or may not be blank spaces available as symbols in the second gaming display. The gaming device preferably has exactly three reels or three display areas for the first gaming display, and preferably a single pay line (e.g., with three reels on a coaxial alignment). Other configurations such as video or mechanical multiple lines and five reel formats, for example, are contemplated. The gaming device is most conveniently provided wherein the first gaming display comprises exactly three reels and the second gaming display comprises exactly one display, such as one reel, wheel or disk. A preferred operation of the device is where while at least one, two or three of the three reels spins (or more reels), the second gaming display is active and has not yet shown a symbol for determining the second prize. By "active" it is meant that the second display is indicating by activity (lights flashing, wheels turning, reels spinning, images changing, etc.) that a choice of a symbol is in progress but has not yet been made apparent to the player. A format that is conventional in gaming arts is to have the three reels stop one reel at a time. It is desirable to have the second gaming display stop after all three reels have stopped and displayed symbols.

The two distinct display segments, the multiple symbol display segment and additional symbol display segment may be provided in any fashion compatible with gaming displays. The most convenient multiple symbol display system would be multiple physical or video simulations of reels, such as a three, four or five reel symbol display system, which is common in the gaming industry. However, any other format of game display is also useful. For example, there could be three roulette-type wheels with symbols available for display. There could be three blank frames with symbols randomly displayed in the game. There could be groups of spaces such as squares within a square with lights randomly lighting symbols in the smaller squares and stopping randomly at a symbol. There could be video representations of cards, with card symbols on the secondary display. For example, the base game could supply one, two, three, four or five cards from the same or separate decks, and a fourth, fifth or sixth card on the bonus wheel. The base game could pay on predetermined 4-card payout made on five card poker hands. In effect, any method for providing symbols to determine if a combination or set or order or single symbol is predetermined as an award symbol display will work in the practice of the invention. Similarly, the additional symbol display may be the same or different type of symbol display. The use of a wheel or fourth reel (preferably in a distinct position relative to the multiple symbol displays for attractiveness and clarity of distinction) has been emphasized in the description solely because of the popularity of these particular types of symbol displays.

The invention is claimed as follows:

1. A gaming system comprising:

at least one input device;

at least one processor; and at least one memory device which stores a plurality of instructions, which when executed by the at least one processor, cause the at least one processor to operate with the at least one input device to:

(a) receive an input associated with a wager;

(b) start a play of a game, the play of the game including a display of at least one of a plurality of game symbols on a first display;

(c) during the play of the game, display a sequence of a plurality of the game symbols on a second display;

(d) after the play of the game ends, determine an outcome based on the at least one game symbol displayed on the first display;

(e) after the sequence ends, indicate at least one of the game symbols displayed on the second display;

(f) provide a first award if the determined outcome is associated with a winning condition;

(g) determine whether the at least one game symbol indicated on the second display has a characteristic in common with the at least one game symbol displayed on the first display;

(h) if the at least one game symbol indicated on the second display has a characteristic in common with the at least one game symbol displayed on the first display, provide a second award; and (i) if the at least one game symbol indicated on the second display does not have any characteristics in common with the at least one game symbol displayed on the first display, do not provide said second award.

2. The gaming system of claim 1, wherein the game includes a game selected from the group consisting of a slot game, a gaming involving a plurality of rotatable reels, a card game, and a dice game.

3. The gaming system of claim 1, wherein: (a) the first display has a form selected from the group consisting of: a video form, a mechanical form, and an electromechanical form; and (b) the second display has a form selected from the group consisting of: a video form, a mechanical form, an electromechanical form, a reel form, a disk form, and a wheel form.

4. The gaming system of claim 1, wherein the plurality of instructions, when executed by the at least one processor, cause the at least one processor to randomly indicate the at least one game symbol displayed on the second display independent of any random determination of the outcome.

5. The gaming system of claim 1, which includes a first award schedule associated with the first display and a different second award schedule associated with the second display.

6. The gaming system of claim 5, wherein:

(a) the first award schedule specifies:

(i) a first winning outcome displayed by the first display, the first winning outcome including a first one of the game symbols; and (ii) a different second winning outcome displayed by the first display, the second winning outcome including the first one of the game symbols; and (b) the second award schedule specifies:

(i) one award as a result of an indicated at least one game symbol displayed on the second display having a characteristic in common with the first one of the game symbols of the first winning outcome; and (ii) a different award as a result of an indicated at least one game symbol displayed on the second display having a characteristic in common with the first one of the game symbols of the second winning outcome.

7. The gaming system of claim 1, wherein the plurality of instructions, when executed by the at least one processor, cause the at least one processor to simultaneously: (i) cause an automatic display of the play of the game on the first display; and (ii) automatically display the sequence of the plurality of the game symbols on the second display.

8. A method for operating a gaming system, the method comprising:

(a) receiving an input associated with a wager;

(b) causing at least one processor to operate with at least one input device to start a play of a game, the play of the game, including causing a first display to display at least one of a plurality of game symbols;

(c) during the play of the game, causing a second display to display a sequence of a plurality of the game symbols;

(d) after the play of the ends, causing the at least one processor to determine an outcome based on the at least one game symbol displayed on the first display;

(e) after the sequence ends, causing the second display to indicate at least one of the game symbols displayed on the second display;

(f) providing a first award if the determined outcome is associated with a winning condition;

(g) causing the at least one processor to determine whether the at least one game symbol indicated on the second display has a characteristic in common with the at least one game symbol displayed on the first display;

(h) if the at least one game symbol indicated on the second display has a characteristic in common with the at least one game symbol displayed on the first display, providing a second award; and (i) if the at least one game symbol indicated on the second display does not have any characteristics in common with the at least one game symbol displayed on the first display, not providing said second award.

9. The method of claim 8, wherein causing the first display to display the play of the game includes causing the first display to display a game selected from the group consisting of: a slot game, a gaming involving a plurality of rotatable reels, a card game, and a dice game.

10. The method of claim 8, wherein: (a) causing the first display to display the play of the game includes displaying the play of the game on a display having a form selected from the group consisting of: a video form, a mechanical form, and an electromechanical form; and (b) causing the second display to display the sequence of the plurality of the game symbols includes displaying the game symbols on a display having a form selected from the group consisting of: a video form, a mechanical form, an electromechanical form, a reel form, a disk form, and a wheel form.

11. The method of claim 8, which includes causing the at least one processor to operate with the second display to randomly indicate the at least one of the game symbols displayed by the second display independent of any random determination of the first outcome.

12. The method of claim 8, which includes causing the at least one processor to: specify a first award schedule associated with the first display and specify a different second award schedule associated with the second display.

13. The method of claim 12, which includes:

(a) causing the at least one processor to specify, for the first award schedule:

(i) a first winning outcome displayed by the first display, the first winning outcome including a first one of the game symbols; and (ii) a different second winning outcome displayed by the first display, the second winning outcome including the first one of the game symbols; and (b) causing the at least one processor to specify, for the second award schedule:

(i) one award as a result of an indicated at least one game symbol displayed on the second display having a characteristic in common with the first one of the game symbols of the first winning outcome; and (ii) a different award as a result of an indicated at least one game symbol displayed on the second display having a characteristic in common with the first one of the game symbols of the second winning outcome.

14. The method of claim 8, which includes simultaneously: (i) causing the first display to automatically display the play of the game; and (ii) causing the second display to automatically display the sequence of the plurality of the game symbols.

15. A gaming system comprising:

at least one input device;

at least one processor; and at least one memory device which stores a plurality of instructions, which when executed by the at least one processor, cause the at least one processor to operate with the at least one input device to:

(a) receive an input associated with a wager;

(b) start a play of a game, the play of the game including a display of at least one of a plurality of game symbols on a first display;

(c) during the play of the game, display a sequence of a plurality of the game symbols on a second display;

(d) after the play of the game ends, determine an outcome based on the at least one game symbol displayed on the first display;

(e) after the sequence ends, indicate at least one of the game symbols displayed on the second display;

(f) provide a first award if the determined outcome is associated with a winning condition;

(g) determine whether the at least one game symbol indicated on the second display matches the at least one game symbol displayed on the first display;

(h) if the at least one game symbol indicated on the second display matches the at least one game symbol displayed on the first display, provide a second award; and (i) if the at least one game symbol indicated on the second display does not match the at least one (lame symbol displayed on the first display, do not provide said second award.

16. The gaming system of claim 15, wherein the game includes a game selected from the group consisting of: a slot game, a gaming involving a plurality of rotatable reels, a card game, and a dice game.

17. The gaming system of claim 15, wherein: (a) the first display has a form selected from the group consisting of: a video form, a mechanical form, and an electromechanical form; and (b) the second display has a form selected from the group consisting of: a video form, a mechanical form, an electromechanical form, a reel form, a disk form, and a wheel form.

18. The gaming system of claim 15, wherein the plurality of instructions, when executed by the at least one processor, cause the at least one processor to randomly indicate the at least one game symbol displayed on the second display independent of any random determination of the outcome.

19. The gaming system of claim 18, which includes a first award schedule associated with the first display and a different second award schedule associated with the second display.

20. The gaming system of claim 19, wherein:

(a) the first award schedule specifies:

(i) a first winning outcome displayed by the first display, the first winning outcome including a first one of the game symbols; and (ii) a different second winning outcome displayed by the first display, the second winning outcome including the first one of the game symbols; and (b) the second award schedule specifies:

(i) one award as a result of an indicated at least one game symbol displayed on the second display matching the first one of the game symbols of the first winning outcome; and (ii) a different award as a result of an indicated at least one game symbol displayed on the second display matching the first one of the game symbols of the second winning outcome.

21. A method for operating a gaming system, the method comprising:

(a) receiving an input associated with a wager;

(b) causing at least one processor to operate with at least one input device to start a play of a game, the play of the game including causing a first display to display a plurality of game symbols;

(c) during the play of the game, causing a second display to display a sequence of a plurality of the game symbols;

(d) after the play of the game ends, causing the at least one processor to determine an outcome based on the at least one game symbol displayed on the first display;

(e) after the sequence ends, causing the second display to indicate at least one of the game symbols displayed on the second display;

(f) providing a first award if the determined outcome is associated with a winning condition;

(g) causing the at least one processor to determine whether the at least one game symbol indicated on the second display matches the at least one game symbol displayed on the first display; and (h) if the at least one game symbol indicated on the second display matches the at least one game symbol displayed on the first display, providing a second award; and (i) if the at least one game symbol indicated on the second display does not match the at least one game symbol displayed on the first display, not providing said second award.

22. The method of claim 21, wherein causing the at least one processor to start the play of the game includes starting a game selected from the group consisting of: a slot game, a gaming involving a plurality of rotatable reels, a card game, and a dice game.

23. The method of claim 21, wherein: (a) the first display has a form selected from the group consisting of: a video form, a mechanical form, and an electromechanical form; and (b) the second display has a form selected from the group consisting of: a video form, a mechanical form, an electromechanical form, a reel form, a disk form, and a wheel form.

24. The method of claim 21, which includes: (a) causing the at least one processor to randomly indicate the at least one game symbol displayed on the second display independent of any random determination of the outcome.

25. The method of claim 21, which includes accessing a first award schedule associated with the first display and accessing a different second award schedule associated with the second display.

* * * * *